(12) United States Patent
Nishikawa (10) Patent No.: US 10,099,739 B2
(45) Date of Patent: Oct. 16, 2018

(54) BICYCLE GUARD AND DRIVE UNIT EQUIPPED WITH BICYCLE GUARD

(71) Applicant: Shimano Inc., Sakai, Osaka (JP)

(72) Inventor: Yusuke Nishikawa, Osaka (JP)

(73) Assignee: Shimano Inc., Osaka (JP)

( * ) Notice: Subject to any disclaimer, the term of this patent is extended or adjusted under 35 U.S.C. 154(b) by 72 days.

(21) Appl. No.: 15/228,691

(22) Filed: Aug. 4, 2016

(65) Prior Publication Data

US 2017/0057582 A1   Mar. 2, 2017

(30) Foreign Application Priority Data

Aug. 31, 2015   (JP) .................................. 2015-171193

(51) Int. Cl.
| | |
|---|---|
| *B62J 13/04* | (2006.01) |
| *B62M 6/55* | (2010.01) |
| *B62K 19/34* | (2006.01) |
| *B62M 9/10* | (2006.01) |
| *B62M 11/14* | (2006.01) |

(52) U.S. Cl.
CPC .............. *B62J 13/04* (2013.01); *B62K 19/34* (2013.01); *B62M 6/55* (2013.01); *B62M 9/105* (2013.01); *B62M 11/145* (2013.01)

(58) Field of Classification Search
CPC ........... B62J 13/00; B62J 13/04; B62K 19/34; B62M 6/55; B62M 11/145
See application file for complete search history.

(56) References Cited

U.S. PATENT DOCUMENTS

| | | | | |
|---|---|---|---|---|
| 4,515,386 A | * | 5/1985 | Tsujimura | ................ B62J 13/00 280/304.3 |
| 5,570,752 A | * | 11/1996 | Takata | ...................... B62M 6/45 180/206.2 |
| 5,758,736 A | * | 6/1998 | Yamauchi | ................ B62M 6/45 180/206.4 |
| 5,826,675 A | * | 10/1998 | Yamamoto | ............... B62M 6/45 180/220 |
| 5,915,493 A | * | 6/1999 | Nakayama | ............... B62M 6/40 180/206.4 |
| 6,073,717 A | * | 6/2000 | Yamamoto | ............... B62M 6/45 180/206.4 |
| 6,119,801 A | * | 9/2000 | Yamashita | ............... B62M 6/10 180/205.5 |
| 6,836,037 B1 | * | 12/2004 | Tsuboi | ..................... B62M 6/45 180/65.8 |
| 7,066,856 B1 | * | 6/2006 | Rogers | ..................... B62J 23/00 474/144 |

(Continued)

FOREIGN PATENT DOCUMENTS

| | | |
|---|---|---|
| JP | 10-138975 A | 5/1998 |
| JP | 2000-6877 A | 1/2000 |

(Continued)

*Primary Examiner* — Kevin Hurley
*Assistant Examiner* — Michael R Stabley
(74) *Attorney, Agent, or Firm* — Global IP Counselors, LLP (57) ABSTRACT

A bicycle guard is provided that has a minimal number of parts required for mounting. A drive unit is provided with the bicycle guard. The bicycle guard includes a first attaching part and a housing. The first attaching part is configured to be attached to a first connection part that connects a bicycle frame. The housing is configured to rotatably support a crankshaft.

22 Claims, 8 Drawing Sheets

(56) References Cited

U.S. PATENT DOCUMENTS

| | | | | |
|---|---|---|---|---|
| 7,097,190 B2* | 8/2006 | Matsumoto | ............. | B62J 13/04 280/281.1 |
| 8,235,849 B2* | 8/2012 | Cranston | ................. | B62J 13/00 280/261 |
| 8,777,791 B1* | 7/2014 | Hino | ........................ | B62M 6/55 180/206.4 |
| 8,820,459 B2* | 9/2014 | Hashimoto | ............. | B62M 6/55 180/206.3 |
| 8,979,685 B2* | 3/2015 | Weagle | ................... | B62J 23/00 474/144 |
| 9,027,691 B2* | 5/2015 | Ishida | ..................... | B62M 6/50 180/206.3 |
| 9,228,652 B2* | 1/2016 | Nishikawa | .......... | F16H 57/0416 |
| 9,236,774 B2* | 1/2016 | Shiraishi | ............... | H02K 1/185 |
| 9,302,734 B2* | 4/2016 | Getta | ...................... | B62M 6/55 |
| 9,327,786 B2* | 5/2016 | Cranston | ................ | F16H 7/20 |
| 9,533,736 B2* | 1/2017 | Watarai | ................. | B62M 9/135 |
| 2013/0095971 A1 | 4/2013 | Hino et al. | | |
| 2013/0153321 A1* | 6/2013 | Preining | ................. | B62M 6/55 180/206.7 |
| 2013/0341112 A1* | 12/2013 | Shiraishi | ................ | H02K 1/185 180/206.4 |
| 2014/0051548 A1 | 2/2014 | Hino et al. | | |
| 2014/0166384 A1* | 6/2014 | Ishida | ...................... | B62M 6/50 180/206.3 |
| 2015/0101874 A1* | 4/2015 | Getta | ...................... | B62M 6/55 180/206.4 |
| 2015/0276042 A1* | 10/2015 | Nishikawa | ............... | B62M 1/36 74/606 A |
| 2015/0336631 A1* | 11/2015 | Nishikawa | .............. | B62M 6/40 74/670 |
| 2016/0101826 A1* | 4/2016 | Watarai | .................. | B62M 9/135 180/206.4 |
| 2016/0288872 A1* | 10/2016 | Shahana | .................. | B62M 6/55 |
| 2016/0339992 A1* | 11/2016 | Yoshiie | .................. | B62M 6/45 |
| 2017/0016526 A1* | 1/2017 | Watarai | ................. | F16H 57/025 |

FOREIGN PATENT DOCUMENTS

| | | |
|---|---|---|
| JP | 3640359 B2 | 4/2005 |
| JP | 4416620 B2 | 2/2010 |
| JP | 2014-37203 A | 2/2014 |

* cited by examiner

BICYCLE GUARD AND DRIVE UNIT EQUIPPED WITH BICYCLE GUARD

This application claims priority to Japanese Patent Application No. 2015-171193, filed on Aug. 31, 2015. The entire disclosure of Japanese Patent Application No. 2015-171193 is hereby incorporated herein by reference.

BACKGROUND

Field of the Invention

The present invention generally relates to a bicycle guard and a drive unit equipped with a bicycle guard.

Background Information

For example, the electric bicycle is disclosed in Japanese Patent No. 3,640,359 that is provided with a protector for protecting the lower portion of the power unit.

SUMMARY

Generally, the present disclosure is directed to various features of a bicycle guard and a drive unit equipped with the bicycle guard. It is desirable for the number of parts required for attaching a member for protecting drive units, such as a power unit, to be minimal.

An object of the present invention is to provide a drive unit and a bicycle guard having a minimal number of parts required for mounting.

One embodiment of the bicycle guard according to the present invention comprises a first attaching part configured to be attached to a first connecting part that connects a housing configured to rotatably support a crankshaft to a bicycle frame.

According to one example of the bicycle guard, the first attaching part is configured to be attached to and detached from the first connecting part in a state in which the housing and the bicycle frame are connected.

According to one example of the bicycle guard, the first connecting part includes a first bolt, and the first attaching part comprises a first hole that receives the first bolt.

The bicycle guard comprises a guard main body configured to cover at least a portion of a lower portion of the housing in a state in which the first attaching part is attached to the first connecting part.

According to one example of the bicycle guard, the guard main body is configured to entirely cover the lower portion of the housing in a state in which the first attaching part is attached to the first connecting part.

One example of the bicycle guard further comprises a second attaching part configured to be attached to at least one of a second connecting part, which connects the housing and the frame in a position different from the first connecting part, the housing and the bicycle frame.

According to one example of the bicycle guard, the second attaching part is configured to be attached to and detached from the at least one of the second connecting part, the housing and the bicycle frame in a state in which the housing and the frame are connected.

According to one example of the bicycle guard, the second connecting part includes a second bolt, and the second attaching part comprises a second hole that receives the second bolt.

According to one example of the bicycle guard, the second attaching part comprises a third hole that receives a third bolt that is configured to be mounted to a bolt attaching part which is provided to the bicycle frame, and configured to be connected to the bicycle frame by the third bolt.

According to one example of the bicycle guard, the second attaching part comprises a guard side hook which is configured to be connected to the frame.

According to one example of the bicycle guard, a guard main body comprises a first end portion and a second end portion, which are configured to cover at least a portion of a lower portion of the housing in a state in which the first attaching part is attached to the first connecting part. The first attaching part is provided on one of the first and second end portions of the guard main body, and the second attaching part is provided on the other of the first and second end portions of the guard main body.

According to one example of the bicycle guard, a guard main body comprises a first end portion and a second end portion, which are configured to cover at least a portion of a lower portion of the housing in a state in which the first attaching part is attached to the first connecting part. The first attaching part is provided adjacent one of the first and second end portions of the guard main body, and the second attaching part is provided adjacent the other of the first and second end portions of the guard main body.

One example of the bicycle guard further comprises a vibration absorber that is provided to at least one of the first attaching part and the second attaching part.

According to one example of the bicycle guard, the first connecting part is configured to connect a first frame side connecting part of the bicycle frame and a first housing side attaching part of the housing. The first connecting part is configured to connect a second frame side connecting part of the bicycle frame and a second housing side attaching part of the housing. The first and second frame side connecting parts are disposed at locations spaced apart in a direction parallel to a rotational axis of the crankshaft and the first and second housing side attaching parts are disposed at locations spaced apart in a direction parallel to the rotational axis of the crankshaft. The first attaching part is disposed between at least one of the frame side connecting parts and the housing side attaching parts.

One embodiment of the drive unit according to the present invention comprises the bicycle guard and the housing.

According to one example of the drive unit, the first connecting part is configured to connect a first frame side connecting part of the bicycle frame and a first housing side attaching part of the bicycle frame. The first connecting part is configured to connect a second frame side connecting part of the bicycle frame and the second housing side attaching part of the bicycle frame. The first and second frame side connecting parts are disposed at locations spaced apart in a direction parallel to a rotational axis of the crankshaft and the first and second housing side attaching parts are disposed at locations spaced apart in a direction parallel to the rotational axis of the crankshaft. Each of the first and a housing side attaching parts comprises a fourth hole that extends in a direction parallel to the rotational axis of the crankshaft.

According to one example of the drive unit, a female thread is formed in the fourth hole.

According to one example of the drive unit, the first connecting part is configured to connect a first frame side connecting part of the bicycle frame and a first housing side attaching part of the bicycle frame. The first connecting part is configured to connect a second frame side connecting part of the bicycle frame and the second housing side attaching part of the bicycle frame. The first and second frame side connecting parts are disposed at locations spaced apart in a direction parallel to a rotational axis of the crankshaft and the first and second housing side attaching parts are disposed at locations spaced apart in a direction parallel to the rotational axis of the crankshaft. The first and second housing side attaching parts are configured to be disposed between the first and second frame side connecting parts.

According to one example of the drive unit, the first attaching part is configured to be disposed between the first and second of housing side attaching parts.

One example of the drive unit further comprises a motor provided to the housing and configured to assist a manual drive force that is applied to the crankshaft.

One example of the drive unit further comprises a transmission provided to the housing and configured to change a transmission ratio of a bicycle.

In the above configurations, the bicycle guard and a drive unit equipped with the bicycle guard are capable of reducing the number of parts required for mounting.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
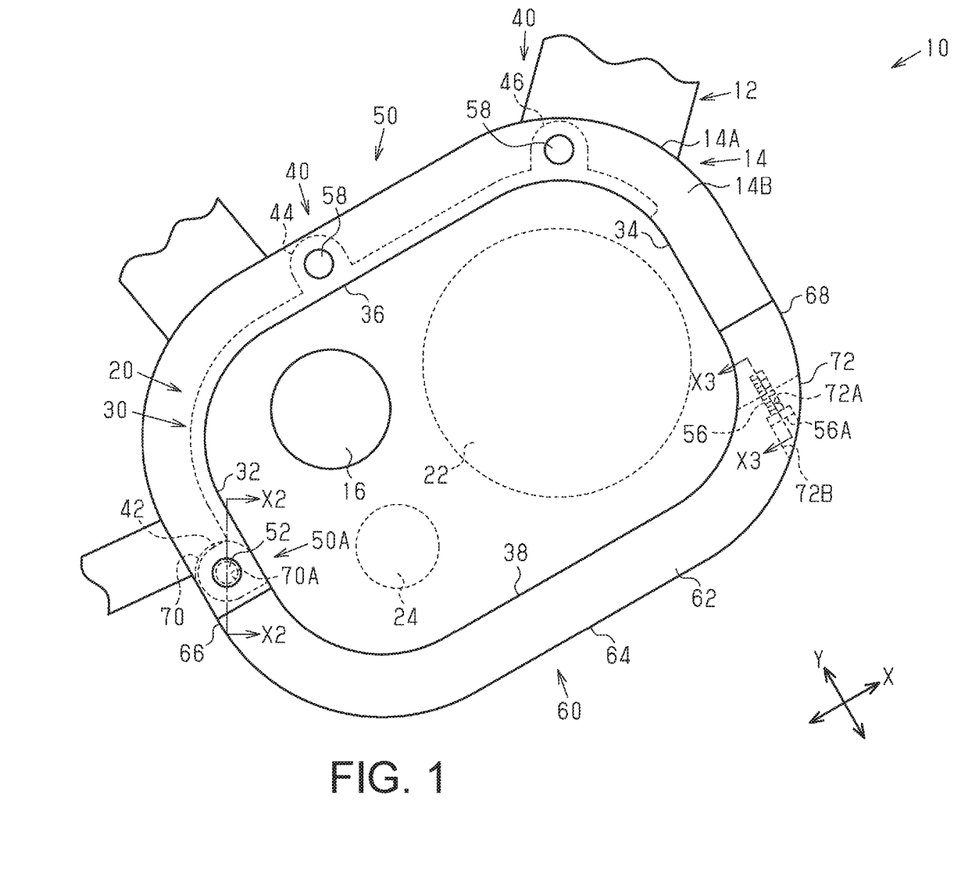
FIG. 1 is a side elevational view of a drive unit in accordance with a first embodiment in a state of being attached to a bicycle frame.

As shown in FIG. 1, a bicycle 10 comprises a frame 12, a crankshaft 16 and a drive unit 20. The frame 12 comprises a bracket 14. The drive unit 20 is attached to the bracket 14.

The drive unit 20 comprises a housing 30 and a bicycle guard 60. The drive unit 20 preferably comprises a motor 22 and a transmission 24. The drive unit 20 is attached to the bracket 14 by at least one connecting part 50. The connecting part 50 includes at least one first connecting part 50A. The first connecting part 50A comprises a first bolt 52. The connecting part 50 further includes a connecting part that is different from the first connecting part 50A. One example is a third bolt 56 and a fourth bolt 58.

The first bolt 52 connects the bracket 14 and the housing 30. The bicycle guard 60 is attached to the first connecting part 50A and protects the drive unit 20 from obstacles. In one example, the bicycle guard 60 can be attached to the first bolt 52. The third bolt 56 connects the bracket 14 and the bicycle guard 60. The fourth bolt 58 connects the bracket 14 and the housing 30. In one example, the number of the first bolt 52 is two, the number of the third bolt 56 is one, and the number of the fourth bolt 58 is four.

The housing 30 supports the crankshaft 16 of the bicycle 10 in a rotatable state. The transmission 24 is provided to the housing 30. In one example, the drive unit 20 further comprises a decelerator (not shown) which decelerates the rotation of the motor 22. The decelerator is provided to the housing 30. The motor 22 is provided to the housing 30 and assists the manual drive force that is applied to the crankshaft 16. In one example, at least a portion of the motor 22 is disposed inside the housing 30.

Output parts (both not shown) to which the front sprocket is mounted are provided to the housing 30. The shape of the output part is a sleeve shape. The output part is connected to the crankshaft 16. The relationship between the housing 30, the motor 22, and the transmission 24 can be freely changed. In a first example, the motor 22 is provided to the housing 30 and the transmission 24 is not provided to the housing 30. In a second example, the motor 22 is not provided to the housing 30 and the transmission 24 is provided to the housing 30.

The portion to which the motor 22 applies a drive force can be freely selected. In a first example, the motor 22 applies a drive force to a drive force transmission path between the crankshaft 16 and the front sprocket. In a second example, the motor 22 applies a drive force to a chain that is wound to the front sprocket via a pulley (both not shown). The relationship between the rotational axis of the output part and the rotational axis of the crankshaft 16 can be freely selected. In a first example, the rotational axis of the output part is provided on a line coaxial with the rotational axis of the crankshaft 16. In a second example, the rotational axis of the output part is provided parallel to the rotational axis of the crankshaft 16.

The transmission 24 is provided to the housing 30 and changes the transmission ratio of the bicycle 10. In one example, the transmission 24 is disposed inside the housing 30. The transmission 24 is provided on a drive force transmission path between the crankshaft 16 and the front sprocket. The transmission 24 comprises a plurality of gears or a plurality of sprockets which are capable of forming a plurality of transmission paths, and changes the transmission ratio by changing the transmission path between the plurality of gears or the plurality of sprockets. When comprising a plurality of gears, the transmission 24 can comprise at least one gear that configures a planetary gear mechanism. When comprising a plurality of sprockets, the transmission 24 can switch a chain or a belt between the plurality of sprockets.

The housing 30 comprises a first end portion 32 and a second end portion 34 in a first direction X, which is determined in advance, and which is perpendicular to the direction in which the crankshaft 16 extends. The housing 30 comprises a third end portion 36 and a fourth end portion 38 in a second direction Y, which is perpendicular to the first direction X and the direction in which the crankshaft 16 extends.

The first end portion 32 is a portion of the housing 30 that is positioned on the rear side of the bicycle 10, when the housing 30 is attached to the bracket 14. The second end portion 34 is a portion of the housing 30 that is positioned on the front side of the bicycle 10, when the housing 30 is attached to the bracket 14. The third end portion 36 is a portion of the housing 30 that is positioned on the upper side of the bicycle 10, when the housing 30 is attached to the bracket 14. The fourth end portion 38 is a portion of the housing 30 that is positioned on the lower side of the bicycle 10, when the housing 30 is attached to the bracket 14. In this manner, the fourth edge portion 38 of the housing 30 configures the lower portion of the housing 30.

The housing 30 is inclined with respect to the longitudinal direction of the bicycle 10, so as to be inclined upward from the first end portion 32 toward the second end portion 34. The housing 30 further comprises a plurality of housing side attaching parts 40. The housing side attaching parts 40 comprises a pair of first housing side attaching parts 42, a pair of second housing side attaching parts 44, and a pair of third housing side attaching parts 46. FIG. 1 illustrates one of the pairs of the first housing side attaching parts 42.

The first housing side attaching parts 42 protrude from the first end portion 32 in one first direction X, and are connected to the bracket 14 by the first bolt 52. The second housing side attaching parts 44 protrude from the third end portion 36 in one second direction Y, and are connected to the bracket 14 by the fourth bolt 58. The third housing side attaching parts 46 protrude upward from the third end portion 36 further on the other of the first direction X side of the housing 30 than the second housing side attaching parts 44, and are connected to the bracket 14 by the fourth bolt 58.

The bracket 14 includes a bracket main body 14A and a pair of (first and second) frame side connecting parts 14B which protrude from the bracket main body 14A toward the side with the drive unit 20. FIG. 1 illustrates one of the frame side connecting parts 14B. The bracket main body 14A is connected to, for example, at least one of a down tube, a seat tube and a seat stay (not shown).

The bracket main body 14A and the frame side connecting parts 14B comprise a shape which follows the shape of the outer peripheral surface of the housing 30 around the crankshaft 16. The bracket main body 14A and the frame side connecting parts 14B are curved along the outer peripheral surface of the housing 30 around the crankshaft 16. The bracket main body 14A surrounds at least a portion of the first end portion 32 of the housing 30, at least a portion of the second end portion 34 of the housing 30, and a third end portion 36 of the housing 30. The fourth edge portion 38 of the housing 30 is not covered by the bracket 14.

Figure 2:
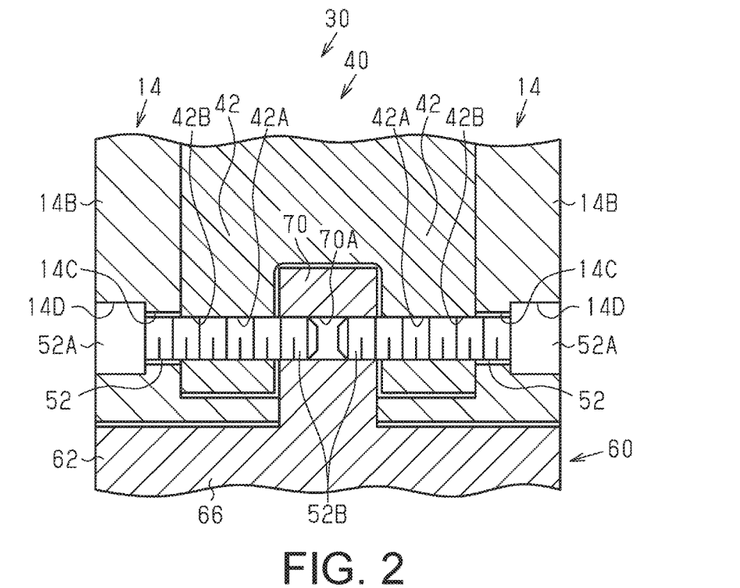
FIG. 2 is a cross sectional view of the drive unit illustrated in FIG. 1 as seen along section line X2-X2 in FIG. 1.

As shown in FIG. 2, the frame side connecting parts 14B are disposed at locations that are spaced apart in a direction parallel to the rotational axis of the crankshaft 16 (hereinafter referred to as the "third direction"). Each of the frame side connecting parts 14B comprises a fifth hole 14C which extends in the third direction, and a recess 14D that is configured to house the head 52A of the first bolt 52. The recesses 14D are provided on the surfaces on the opposite sides of the surfaces of the frame side connecting parts 14B that face each other. The fifth hole 14C and the recess 14D are provided to the portion of the frame side connecting part 14B that covers the first end portion 32 of the housing 30.

The first housing side attaching parts 42 are disposed at locations that are spaced apart in the third direction, which is a direction parallel to the rotational axis of the crankshaft 16. Each of the first housing side attaching parts 42 comprises a fourth hole 42A that extends in the third direction. In one example, the surface of the first housing side attaching part 42 on which the fourth hole 42A is formed has a cylindrical shape. The fourth hole 42A is provided with a female thread 42B. The first housing side attaching parts 42 are disposed between the p frame side connecting parts 14B. One of the first housing side attaching parts 42 contacts one of the frame side connecting parts 14B. The other first housing side attaching part 42 contacts the other frame side connecting part 14B.

The material that forms the bicycle guard 60 is at least one of metal and resin. The bicycle guard 60 has a shape which follows the shape of the outer peripheral surface around the crankshaft 16, and is curved along the outer peripheral surface of the housing 30 around the crankshaft 16. In one example, the bicycle guard 60 is formed to be in a U-shape when viewed from the third direction. The bicycle guard 60 covers the portion of the outer peripheral surface of the housing 30 around the crankshaft 16 that is not covered by the bracket 14.

The bicycle guard 60 includes a first attaching part 70. The first attaching part 70 is configured to be attachable to the first connecting part 50A. The first attaching part 70 is disposed between the first housing side attaching parts 42. The dimension of the first attaching part 70 in the third direction is less than or equal to a distance between the first housing side attaching parts 42. The first attaching part 70 can be selectively attached to and detached from the first bolt 52, which is one example of a first connecting part 50A, without damaging the first attaching part 70, while in a state in which the first housing side attaching part 42 and the frame side connecting part 14B are connected. That is, in a state in which the housing 30 and the frame 12 are connected. In the case that the housing 30 and the frame 12 are connected by the first bolt 52, if the distal end portion of the first bolt 52 does not protrude into the space between the first housing side attaching parts 42, the bicycle guard 60 can be removed from the first bolt 52. Preferably, the bicycle guard 60 further comprises a guard main body 62 and a second attaching part 72.

The guard main body 62 comprises an intermediate portion 64, a first end portion 66 and a second end portion 68. The intermediate portion 64 covers the intermediate portion of a fourth end portion 38 of the housing 30 from a lower side of the bicycle 10. The first end portion 66 covers the portion of the fourth end portion 38 of the housing 30 on the side with the first end portion 32, and from the rear of the bicycle 10. The second end portion 68 covers the portion of the fourth end portion 38 of the housing 30 on the side with the second end portion 34, and from the front of the bicycle 10. In this manner, the guard main body 62 is configured to entirely cover the fourth end portion 38 of the housing 30 from the lower side, from the rear, and from the front of the bicycle 10.

Figure 3:
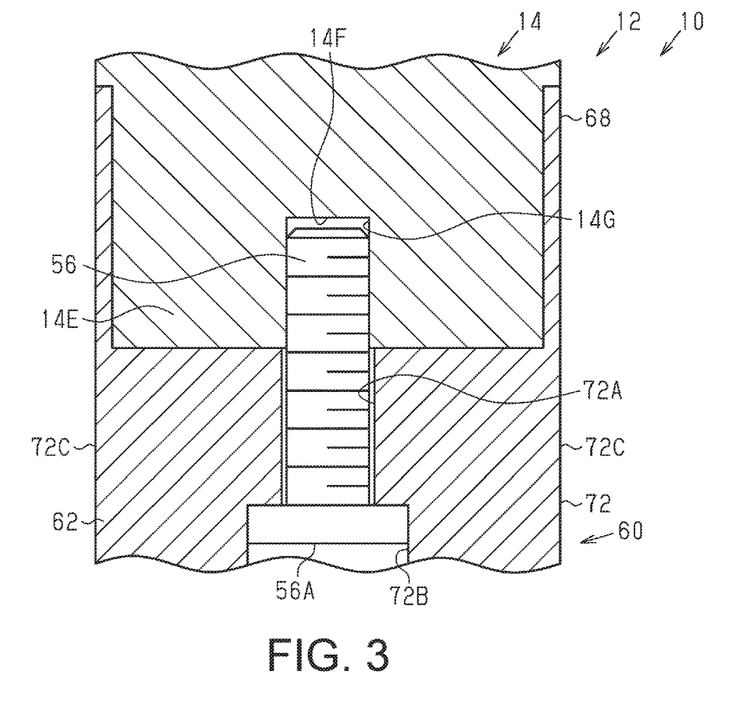
FIG. 3 is a cross sectional view of the drive unit illustrated in FIG. 1 as seen along section line X3-X3 in FIG. 1.

The first attaching part 70 is provided to the first end portion 66. The first attaching part 70 comprises a first hole 70A that receives the first bolt 52. The second attaching part 72 is provided to the second end portion 68. The second attaching part 72 comprises a third hole 72A that receives the third bolt 56, and a recess 72B to which the head 56A of the third bolt 56 is disposed.

As shown in FIG. 2, in one example, the frame side connecting parts 14B, the first housing side attaching parts 42, and the first attaching part 70 are connected by two of the first bolts 52. These elements are specifically connected as follows. One of the first bolts 52 is inserted into a first of the frame side connecting parts 14B, a first of the first housing side attaching parts 42, and the first attaching part 70 so that the distal end of that first bolt 52 is disposed in the first hole 70A of the first attaching part 70. The first bolt 52 is inserted in the fourth hole 42A. The head 52A of the first bolt 52 is housed in the recess 14D. In the same manner, the other first bolt 52 is inserted into a second of the frame side connecting part 14B, a second of the first housing side attaching part 42, and the first attaching part 70 so that the distal end thereof is disposed in the first hole 70A of the first attaching part 70. In this manner, the first attaching part 70 can be attached to the first bolt 52, which is one example of a first connecting part that connects the housing 30, which rotatably supports the crankshaft 16, and the bracket 14, which is provided to the frame 12 of the bicycle 10.

The guard main body 62 is configured so as to be rotatable around the longitudinal axis of the first bolt 52, in a state in which the frame side connecting part 14B, the first housing side attaching part 42, and the first attaching part 70 are connected by at least one of the first bolts 52. In another example, the guard main body 62 is configured so as to be not rotatable around the axis of the first bolt 52, in a state in which the frame side connecting part 14B, the first housing side attaching part 42, and the first attaching part 70 are connected by at least one of the first bolts 52. In this configuration, a female thread is provided to the first hole 70A of the first attaching part 70. In the case that the first bolt 52 is screwed into the first hole 70A, the guard main body 62 is non-rotatable around the longitudinal axis of the first bolt 52, while in a state in which the frame side connecting part 14B, the first housing side attaching part 42, and the first attaching part 70 are connected by the first bolt 52.

The intermediate portion 64, the first end portion 66, and the second end portion 68 of the guard main body 62 each covers the fourth end portion 38 of the housing 30. The guard main body 62 entirely covers the fourth end portion 38, by the guard main body 62 being rotated around the longitudinal axis of the first bolt 52 in a direction that approaches the housing 30. In one example, the guard main body 62 is disposed at a location spaced between the fourth end portion 38 of the housing 30, so as to not come in contact with the fourth end portion 38 of the housing 30. In another example, the guard main body 62 is provided so as to come in contact with a portion of the fourth end portion 38 of the housing 30. In this manner, the guard main body 62 is configured to cover the entire fourth end portion 38 of the housing 30, while in a state in which the first attaching part 70 is attached to the first housing side attaching part 42 by the first bolt 52.

As shown in FIG. 3, the bracket 14 comprises a bolt attaching portion 14E to which the third bolt 56 can be mounted, and a sixth hole 14F that receives the third bolt 56 is inserted. A female thread 14G is formed on the surface of the bolt attaching portion 14E on which is formed the sixth hole 14F. The second attaching part 72 of the guard main body 62 further comprises a pair of side walls 72C. The side walls 72C are disposed at locations spaced apart in the third direction. The bolt attaching portion 14E is disposed between the side walls 72C. One of the side walls 72C contacts the bolt attaching portion 14E. The center axis of the sixth hole 14F and the center axis of the third hole 72A are provided coaxially, in a state in which the guard main body 62 covers the fourth end portion 38 of the housing 30. Accordingly, the third bolt 56 can be inserted into the sixth hole 14F and the third hole 72A. In this manner, a third bolt 56, which can be mounted to the bolt attaching portion 14E that is provided to the bracket 14 which is a part of the frame 12, can be inserted into the third hole 72A.

The second attaching part 72 and the bolt attaching portion 14E are connected by the third bolt 56 being inserted into the third hole 72A of the second attaching part 72 and being screwed to the female thread 14G of the bolt attaching portion 14E. That is, the second attaching part 72 can be connected to the bolt attaching portion 14E that is provided to the bracket 14, which is a part of the frame 12, by the third bolt 56. The head 56A of the third bolt 56 is disposed in the recess 72B of the second attaching part 72. The second attaching part 72 can be attached to and detached from the bolt attaching portion 14E of the bracket 14, which is a part of the frame 12, without damaging the bolt attaching portion 14E, while in a state in which the first housing side attaching part 42 and the frame side connecting part 14B are connected.

According to the first embodiment, the following effects are obtained. (1) Since the bicycle guard 60 comprises a first attaching part 70 that can be attached to a first bolt 52, which is one example of a first connecting part 50A that connects the frame 12 and the housing 30, it is possible to reduce the number of parts required for attaching the drive unit 20.

(2) The guard main body 62 is configured to entirely cover the fourth end portion 38 of the housing 30, while in a state in which the first attaching part 70 is attached to the first bolt 52. According to this configuration, an obstacle or the like coming in contact with the fourth end portion 38 of the housing 30 can be prevented by the guard main body 62, and the risk of the drive unit 20 being damaged can be reduced.

(3) The second attaching part 72 is configured to be attached to and detached from the frame 12 without damaging the frame 12 while in a state in which the frame 12 and the housing 30 are connected by at least the first bolt 52 and the fourth bolt 58. According to this configuration, since the second end portion 68 of the guard main body 62 is configured to be attached to and detached from the frame 12 without removing the housing 30 from the frame 12 and without damage, the labor required for the attachment and detachment work is reduced.

(4) The first attaching part 70 is configured to be disposed between the f first housing side attaching parts 42. According to this configuration, since the guard main body 62 is attached to the drive unit 20 or the frame 12, the guard main body 62 is suppressed from becoming large in the third direction.

Second Embodiment

Figure 4:
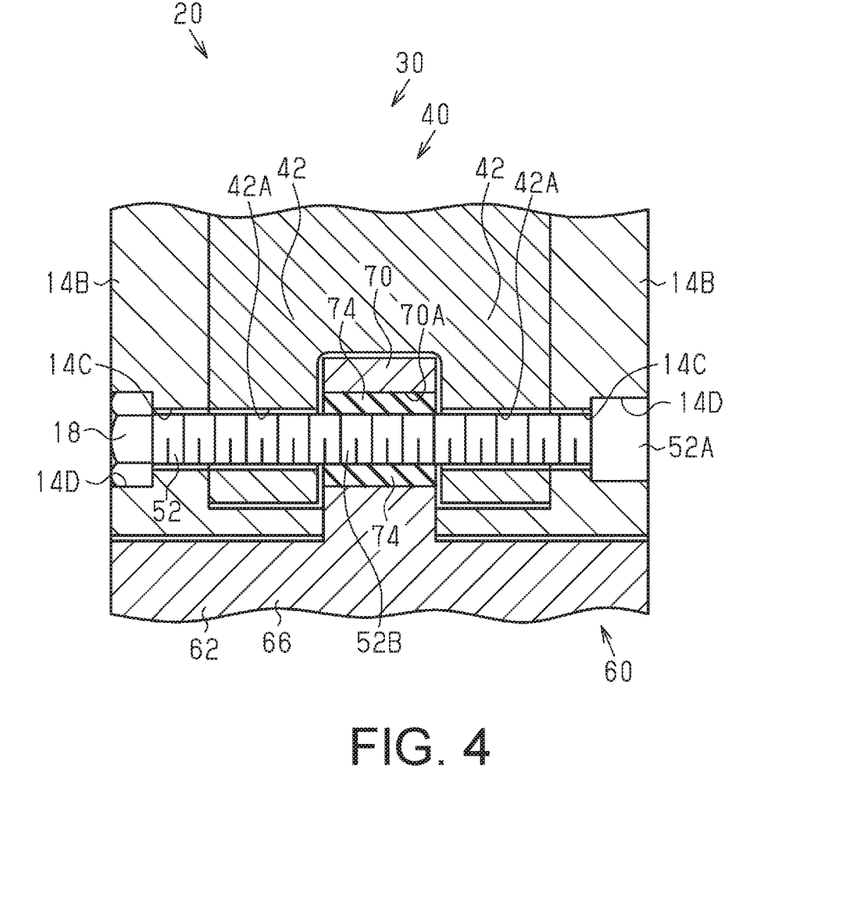
FIG. 4 is a cross sectional view of a drive unit in accordance with a second embodiment in a state of being attached to the bicycle frame.

FIG. 4 is a cross-sectional view of the drive unit 20 of the second embodiment corresponding to the cross-sectional view along the X2-X2 line in FIG. 1. The drive unit 20 of the second embodiment differs from the drive unit 20 of the first embodiment in the point that the attachment structure of the first end portion 66 of the bicycle guard 60 is different, but has substantially the same configuration as the drive unit 20 of the first embodiment in the other points.

Female threads 42B are not formed on the inner perimeter surface of the fourth hole 42A of the first housing side attaching parts 42. The bicycle guard 60 further comprises a vibration absorber 74 that is provided to the first attaching part 70. Examples of materials that form the vibration absorber 74 are rubber, sponge, or urethane resin. The vibration absorber 74 has a tubular shape. The vibration absorber 74 is inserted in the first hole 70A of the first attaching part 70 and attached to the first attaching part 70. The vibration absorber 74 has a hole with a size that is configured to insert the first bolt 52. The inner diameter of the hole of the vibration absorber 74 is preferably a size with which the surface of the hole of the vibration absorber 74 and the outer diameter portion of the first bolt 52 are in close contact.

The head 52A of the first bolt 52 is housed in a recess 14D of the other frame side connecting part 14B. A threaded portion 52B of the first bolt 52 is screwed to a nut 18, which is housed in the recess 14D of one of the first housing side attaching parts 42. The frame side connecting parts 14B, the first housing side attaching parts 42, and the first attaching part 70 are connected by the first bolt 52.

According to the second embodiment, the following effects are obtained. (5) Since the bicycle guard 60 further comprises a vibration absorber 74 that is provided to the first attaching part 70, when a force is applied to the guard main body 62, the force is reduced by the vibration absorber 74. According to the second embodiment, the same effects as the effects of (1) to (4) of the first embodiment are also obtained.

Third Embodiment

Figure 5:
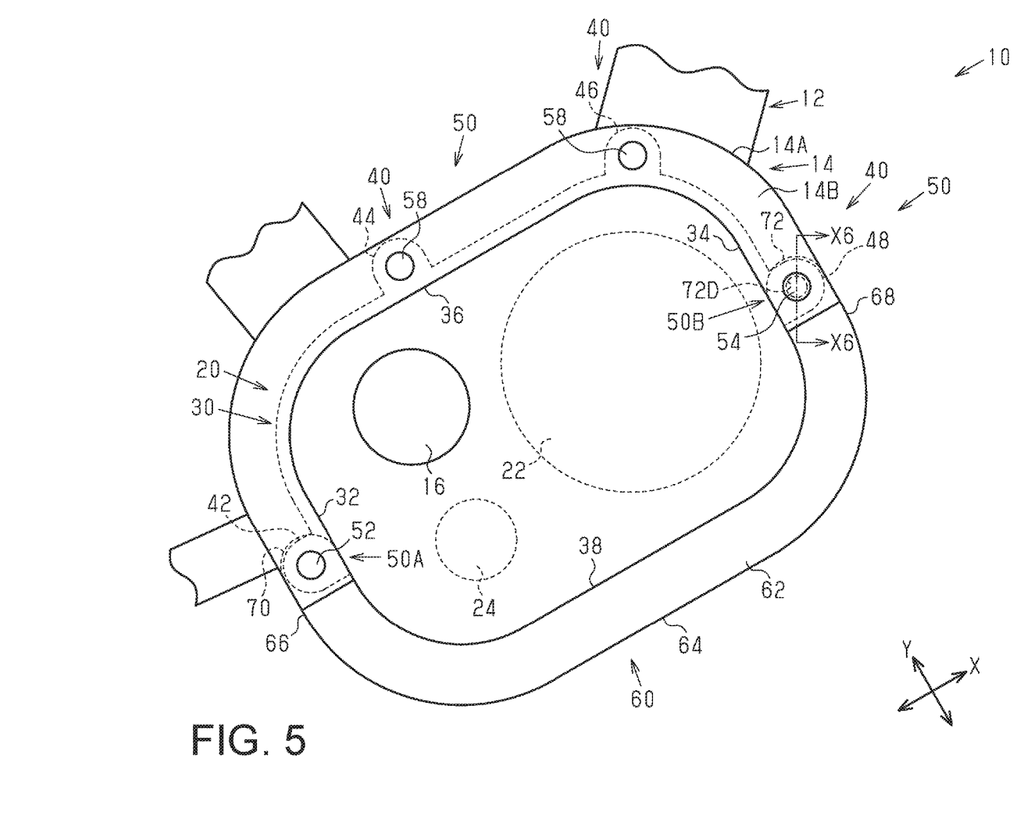
FIG. 5 is a side elevational view of a drive unit of in accordance with a third embodiment in a state of being attached to the bicycle frame.
Figure 6:
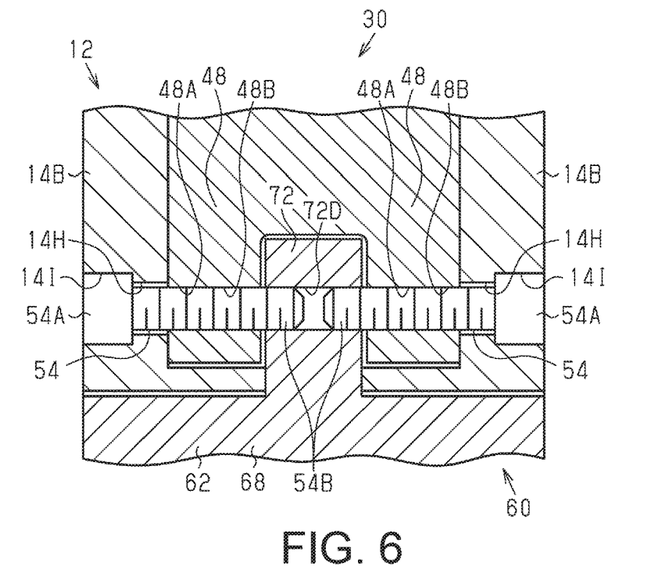
FIG. 6 is a cross-sectional view of the drive unit illustrated in FIG. 5 as seen along section line X6-X6 in FIG. 5.

The drive unit 20 of the third embodiment shown in FIGS. 5 and 6 differs from the drive unit 20 of the first embodiment in the point that the attachment structure of the second end portion 68 of the bicycle guard 60 is different, but has substantially the same configuration as the drive unit 20 of the first embodiment in the other points.

The connecting part 50 further includes a second connecting part 50B other than the first connecting part 50A. The second connecting part 50B comprises a second bolt 54. The second bolt 54 connects the housing 30 and the bracket 14 of the frame 12 in a position different from the first bolt 52. The bicycle guard 60 is configured to be attachable to the second connecting part 50B.

The housing side attaching parts 40 further comprise a pair of fourth housing side attaching parts 48. The fourth housing side attaching parts 48 has a similar structure to the first housing side attaching parts 42. The fourth housing side attaching parts 48 protrude from the second end portion 34 of the housing 30 in the first direction X of the housing 30. The fourth housing side attaching part 48 is connected to the bracket 14 by the second bolt 54. The second attaching part 72 has a structure that is substantially the same as the first attaching part 70, instead of the structure of the second attaching part 72 illustrated in the first embodiment. The second attaching part 72 is configured to be attachable to the second connecting part 50B. The second attaching part 72 comprises a second hole 72D that receives is inserted the second bolt 54. In one example, the second hole 72D is configured so that the inner diameter thereof becomes greater than or equal to the outer diameter of the threaded portion 54B of the second bolt 54. In another example, the second hole 72D is provided with a female thread into which the second bolt 54 is screwed.

As shown in FIG. 6, each of the frame side connecting parts 14B comprises a seventh hole 14H which extends in the third direction, and a recess 14I that is configured to house the head 54A of the second bolt 54. The recesses 14I are provided on the surfaces on the opposite sides of the surfaces of the frame side connecting parts 14B that face each other. The seventh hole 14H and the recess 14I are provided to the portion of the frame side connecting part 14B that covers at least a portion of the second end portion 34 of the housing 30. The fourth housing side attaching parts 48 are provided at an interval in the third direction. Each of the fourth housing side attaching parts 48 comprises an eighth hole 48A that extends in the third direction. The surface of the fourth housing side attaching part 48 on which the eighth hole 48A is formed, is provided with a female thread 48B.

The fourth housing side attaching parts 48 are disposed between the frame side connecting parts 14B. One of the fourth housing side attaching parts 48 contacts one of the frame side connecting parts 14B. The other of the fourth housing side attaching parts 48 contacts the other of the frame side connecting parts 14B. The second attaching part 72 is disposed between the fourth housing side attaching parts 48. The dimension of the second attaching part 72 in the third direction is less than or equal to the distance between the fourth housing side attaching parts 48. In one example, the frame side connecting parts 14B, the fourth housing side attaching parts 48, and the second attaching part 72 are connected by two second bolts 54. These elements are connected in the same form as the form of connecting the frame side connecting parts 14B and the like by the first bolt 52 in the first embodiment. The frame side connecting part 14B and the fourth housing side attaching part 48 are connected, and the second attaching part 72 is supported, by at least one of the second bolts 54.

The second attaching part 72 can be attached to and detached from the second bolt 54 and the fourth housing side attaching part 48, without damaging the second attaching part 72 or the fourth housing side attaching part 48 while in a state in which the housing side attaching part 40 and the frame side connecting part 14B are connected. In the case that the housing 30 and the frame 12 are connected by the second bolt 54, if the distal end portion of the second bolt 54 does not protrude into the space between the fourth housing side attaching parts 48, the bicycle guard 60 can be removed from the second bolt 54.

According to the third embodiment, the following effects are obtained. (6) Since the first attaching part 70 and the second attaching part 72 have substantially the same structure, the content of the attachment and detachment work regarding the first attaching part 70 and the second attaching part 72 can be made common. According to the third embodiment, the same effects as the effects of (1) to (4) of the first embodiment are also obtained.

Fourth Embodiment

Figure 7:
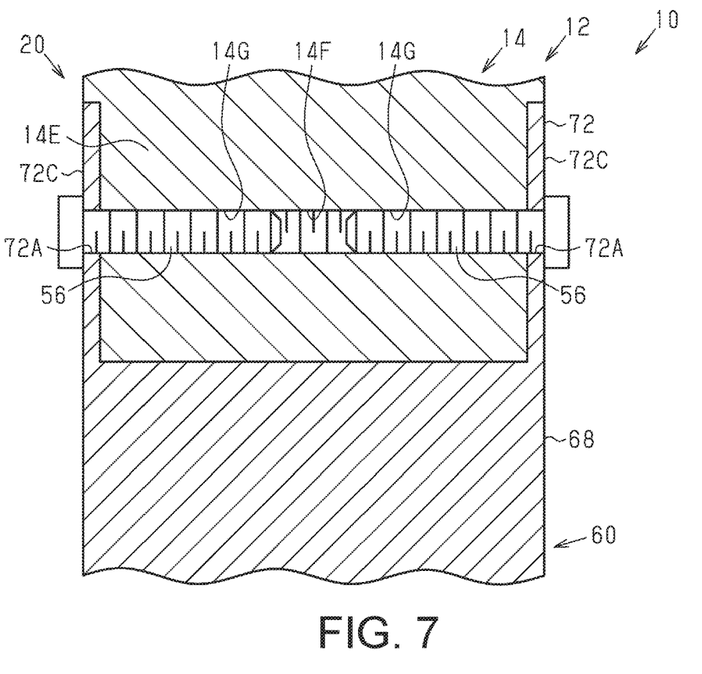
FIG. 7 is a cross-sectional view of a drive unit of in accordance with a fourth embodiment in a state of being attached to the bicycle frame.

FIG. 7 is a cross-sectional view of the drive unit 20 of the fourth embodiment corresponding to the cross-sectional view along the X3-X3 line in FIG. 1. The drive unit 20 of the fourth embodiment differs from the drive unit 20 of the first embodiment in the point that the attachment structure of the second end portion 68 of the bicycle guard 60 is different, but has substantially the same configuration as the drive unit 20 of the first embodiment in the other points.

The sixth hole 14F that is formed in the bolt attaching portion 14E, unlike the sixth hole 14F illustrated in the first embodiment, extends through the bolt attaching portion 14E in the third direction. A female thread 14G is formed on the surface of the bolt attaching portion 14E on which is formed the sixth hole 14F. The third hole 72A is formed on each of the side walls 72C, unlike the third hole 72A illustrated in the first embodiment. The third hole 72A extends through the side wall 72C in the third direction. The center axis of the sixth hole 14F and the axis of the third hole 72A are provided coaxially, in a state in which the guard main body 62 covers the fourth end portion 38 of the housing 30. Accordingly, the third bolt 56 can be inserted into the sixth hole 14F and the third hole 72A. The bicycle guard 60 is connected to the frame 12 by the third bolt 56 being inserted into the third hole 72A of the side wall 72C from the outer side in the third direction, and being screwed to the female thread 14G of the bolt attaching portion 14E. According to the fourth embodiment, the same effects as the effects of (1) to (4) of the first embodiment are also obtained.

Fifth Embodiment

Figure 8:
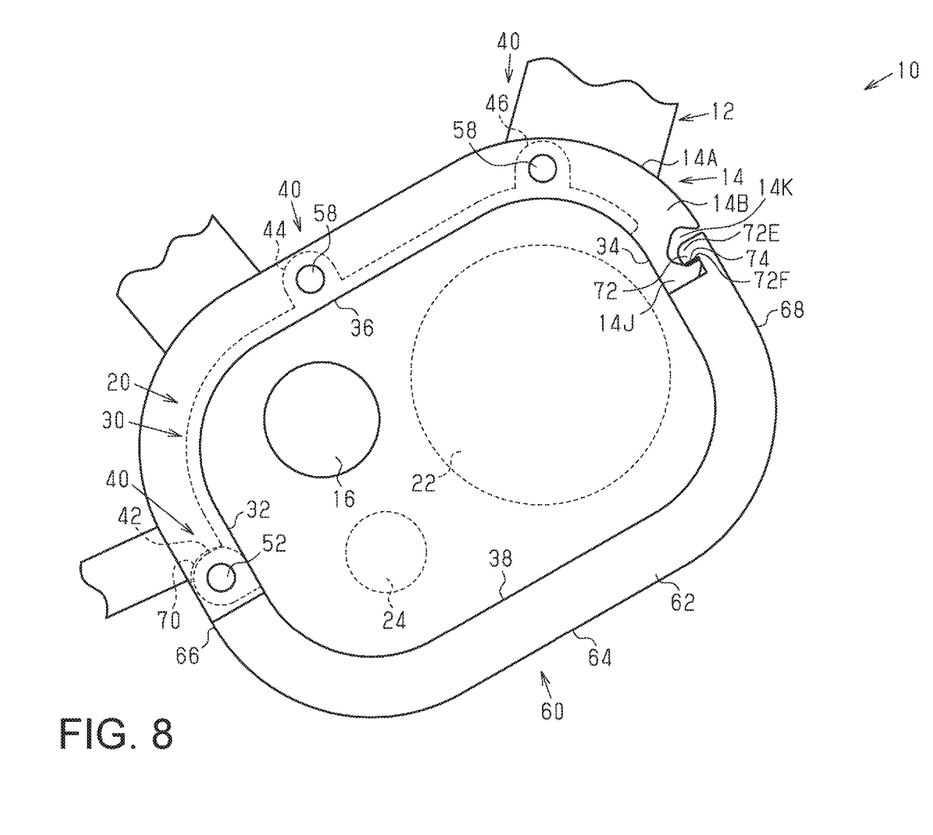
FIG. 8 is a side view of a drive unit of in accordance with a fifth embodiment in a state of being attached to the bicycle frame.

The drive unit 20 of the fifth embodiment shown in FIG. 8 differs from the drive unit 20 of the first embodiment in the point that the attachment structure of the second end portion 68 of the bicycle guard 60 is different, but has substantially the same configuration as the drive unit 20 of the first embodiment in the other points.

The bracket 14 comprises a frame side hook 14J instead of the bolt attaching portion 14E illustrated in the first embodiment. The second attaching part 72 comprises a guard side hook 72E instead of the third hole 72A illustrated in the first embodiment. The guard side hook 72E is configured to be connected to the frame side hook 14J. The frame side hook 14J comprises an opening 14K that is opened toward the front of the bicycle 10. In one example, the opening 14K is provided from one end portion to the other end portion of the bracket 14 in the third direction. In another example, the opening 14K of the frame side hook 14J is provided to a portion of the bracket 14 in the third direction.

The guard side hook 72E comprises an engagement portion 72F which engages with the opening 14K of the frame side hook 14J. The engagement portion 72F is provided to a position corresponding to at least the opening 14K of the frame side hook 14J, in a state in which the bicycle guard 60 is attached to the bracket 14.

In a preferred example, a regulating portion for restricting the relative movement of the frame side hook 14J and the guard side hook 72E in the third direction is provided to at least one of the frame side hook 14J and the guard side hook 72E. The regulating portion comprises, for example, a pair of wall portions which are provided at both ends of the guard side hook 72E in the third direction. The wall portions respectively come in contact with the two end surfaces of the bracket 14 in the third direction, in a state in which the bicycle guard 60 is attached to the bracket 14. The configuration of the regulating portion is not limited to the configuration described above and may be freely changed, as long as the configuration is capable of regulating the movement of the bicycle guard 60 in the third direction.

The bicycle guard 60 preferably further comprises the vibration absorber 74 that is provided to the guard side hook 72E, which is a portion of the second attaching part 72. The vibration absorber 74 is provided to the guard side hook 72E of the second attaching part 72. The vibration absorber 74 is provided to the guard side hook 72E so as to be sandwiched between the guard side hook 72E and the frame side hook 14J, in a state in which the guard side hook 72E is connected to the frame side hook 14J. In another example, the vibration absorber 74 is provided to the frame side hook 14J.

According to the fifth embodiment, the following effects are obtained.

(7) The second attaching part 72 comprises the guard side hook 72E which can be connected to the frame 12. According to this configuration, it is not required to use a tool when attaching the second attaching part 72 to the frame 12.

(8) The bicycle guard 60 further comprises the vibration absorber 74 that is provided to the second attaching part 72. According to this configuration, when a force is applied to the guard main body 62, the force is reduced by the vibration absorber 74. According to the fifth embodiment, the same effects as the effects of (1) to (4) of the first embodiment are also obtained.

Sixth Embodiment

Figure 9:
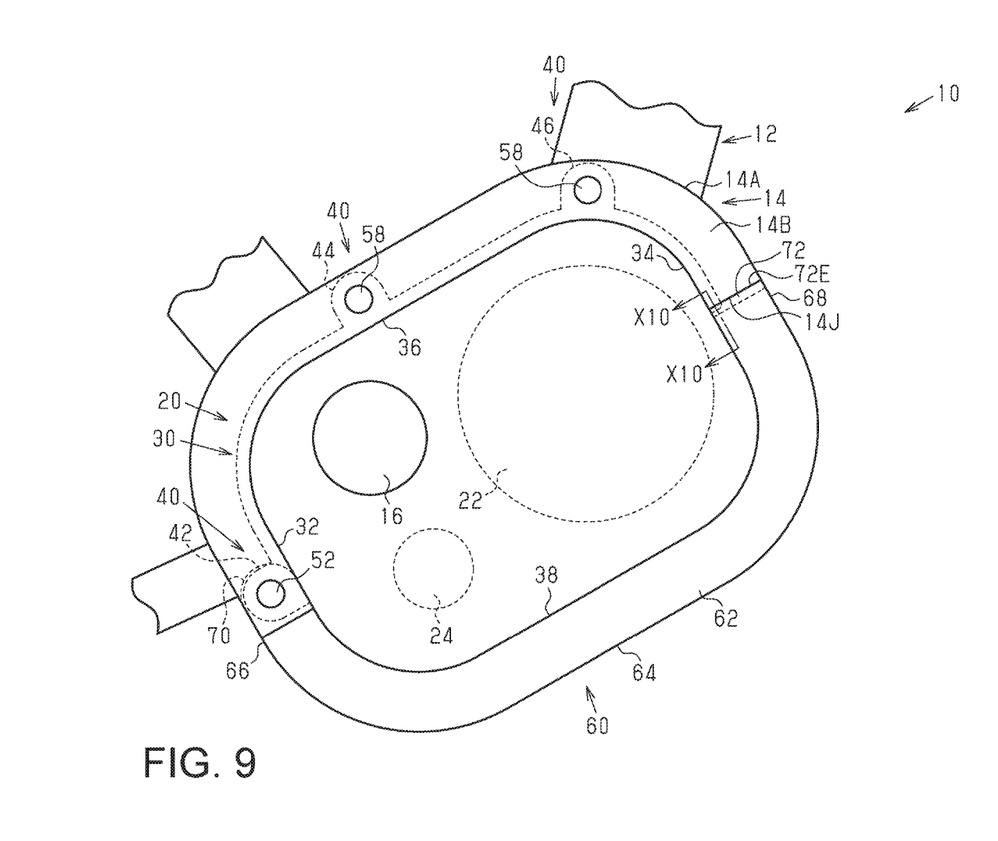
FIG. 9 is a side view of a drive unit of in accordance with a sixth embodiment in a state of being attached to the bicycle frame.
Figure 10:
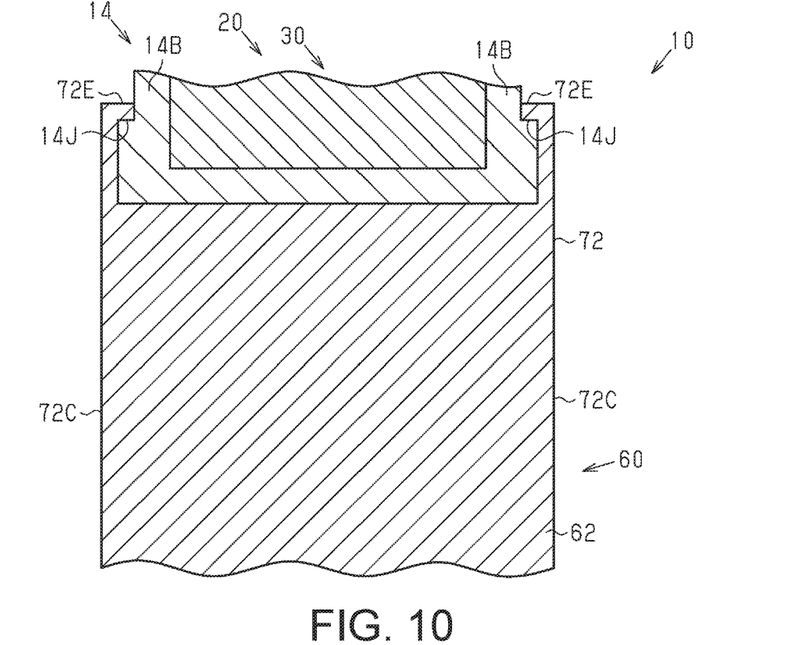
FIG. 10 is a cross-sectional view of the drive unit illustrated in FIG. 9 as seen along section line X10-X10 in FIG. 9.

The drive unit 20 of the sixth embodiment shown in FIGS. 9 and 10 differs from the drive unit 20 of the fifth embodiment in the point that the attachment structure of the second end portion 68 of the bicycle guard 60 is different, but has substantially the same configuration as the drive unit 20 of the fifth embodiment in the other points.

As shown in FIGS. 9 and 10, the frame side hook 14J and the guard side hook 72E have a structure to sandwich the frame side hook 14J with the guard side hook 72E, instead of the structure of the frame side hook 14J and the guard side hook 72E illustrated in the fifth embodiment.

The frame side connecting part 14B includes a pair of frame side hooks 14J. One of the frame side hooks 14J is provided to a portion of the second attaching part 72 which faces one of the side walls 72C. The other of the frame side hooks 14J is provided to a portion of the second attaching part 72 which faces the other of the side walls 72C.

The second attaching part 72 comprises a pair of the guard side hooks 72E. One of the guard side hook 72E is provided to the end of one of the side walls 72C. The other guard side hook 72E is provided to the end of the other side wall 72C. In a preferred example, the vibration absorber 74 is provided to the guard side hook 72E or the frame side hook 14J so that the vibration absorber 74 is disposed between the guard side hook 72E and the frame side hook 14J. The guard side hooks 72E are attached to the frame side hooks 14J so as to sandwich the frame side hooks 14J from the outer side in the third direction. According to the sixth embodiment, the same effects as the effects of (1) to (4) of the first embodiment, and the effect of (7) of the fifth embodiment, are also obtained.

Seventh Embodiment

Figure 11:
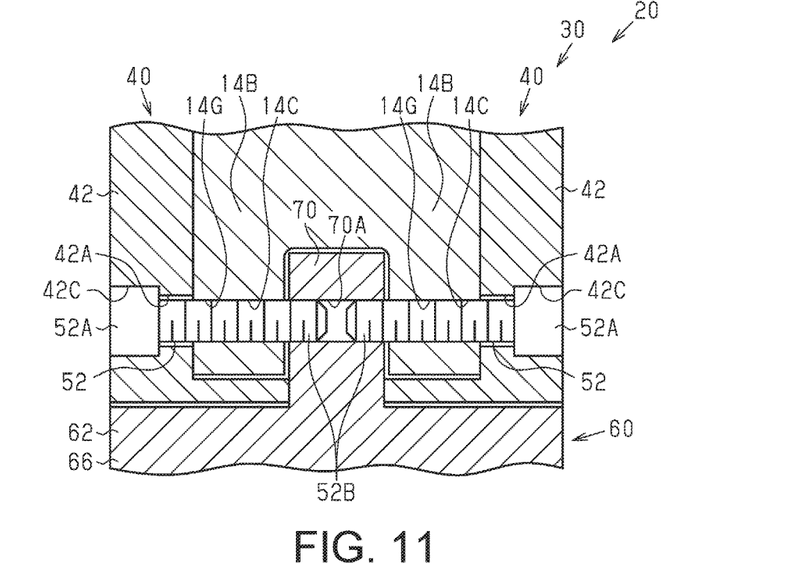
FIG. 11 is a cross-sectional view of a drive unit of in accordance with a seventh embodiment in a state of being attached to the bicycle frame.

FIG. 11 is a cross-sectional view of the drive unit 20 of the seventh embodiment corresponding to the cross-sectional view along the X2-X2 line in FIG. 1. The drive unit 20 of the seventh embodiment differs from the drive unit 20 of the first embodiment in the point that the attachment structure of the drive unit 20 to the frame 12 is different, but has substantially the same configuration as the drive unit 20 of the first embodiment in the other points.

The bracket 14 and the housing 30 have a structure in which the frame side connecting parts 14B are disposed between the first housing side attaching parts 42, instead of the structure of the frame side connecting parts 14B and the first housing side attaching parts 42 illustrated in the first embodiment.

Unlike the frame side connecting parts 14B illustrated in the first embodiment, the recess 14D is not formed in the frame side connecting parts 14B. A female thread 14G is formed on the surface of the frame side connecting part 14B on which is formed the fifth hole 14C. Unlike the first housing side attaching parts 42 illustrated in the first embodiment, each of the first housing side attaching parts 42 comprises a recess 42C that is configured to house the head 52A of the first bolt 52. The frame side connecting parts 14B are disposed between the first housing side attaching parts 42. The frame side connecting part 14B contacts the first housing side attaching part 42.

The first attaching part 70 is disposed between the frame side connecting parts 14B. The dimension of the second attaching part 72 in the third direction is less than or equal to the distance between the frame side connecting parts 14B. In one example, the frame side connecting parts 14B, the second housing side attaching parts 44, and the first attaching part 70 are connected by two first bolts 52. According to the seventh embodiment, the same effects as the effects of (1) to (4) of the first embodiment are obtained.

MODIFICATIONS

The descriptions relating to each embodiment described above are examples of forms that the bicycle guard and the drive unit according to the present invention can take, and are not intended to limit the forms thereof. The bicycle guard and the drive unit according to the present invention may, in addition to each of the embodiments described above, take the forms of each modified example of the embodiments shown below, as well as forms that combine at least two modified examples that are not mutually contradictory.

The positional relationship of the first attaching part 70, the housing side attaching part 40, and the frame side connecting part 14B can be freely changed. In the first example, the frame side connecting parts 14B are disposed between the first housing side attaching parts 42. The first attaching part 70 is disposed between the frame side connecting parts 14B. In the second example, the first attaching parts 70 are provided to the guard main body 62. The first attaching parts 70 are disposed between the frame side connecting parts 14B. The housing side attaching part 40 is disposed between the first attaching parts 70. In the third example, the first attaching parts 70 are provided to the guard main body 62. The frame side connecting parts 14B are disposed between the first attaching parts 70. The housing side attaching part 40 is disposed between the frame side connecting parts 14B. In the fourth example, the attaching parts 70 are provided to the guard main body 62. The housing side attaching parts 40 are disposed between the first attaching parts 70. The frame side connecting part 14B is disposed between the housing side attaching parts 40.

The shape of the guard main body 62 can be changed to any shape with which it is possible to cover at least a portion of the lower portion of the housing 30, in a state in which the first attaching part 70 is attached to the first housing side attaching part 42 by the first bolt 52.

The configuration of the first connecting part 50A can be freely changed. The first example is a band. Examples of materials for the band include resin or metal. One example of resin is hard polyethylene. The second example is a combination of the first bolt 52 and the nut 18. The connecting part 50 and the second connecting part 50B can also be changed as well.

The positions of the first attaching part 70 and the second attaching part 72 in the guard main body 62 of the first embodiment can be freely changed. In one example, the first attaching part 70 is provided toward the first end portion 66 of the guard main body 62 and the second attaching part 72 is provided toward the second end portion 68 of the guard main body 62.

The vibration absorber 74 can be disposed in a site other than that illustrated in the second embodiment. In a first example, the vibration absorber 74 is inserted in the first hole 70A of the first attaching part 70 and attached to the first attaching part 70 in the first embodiment or the seventh embodiment. In a second example, the vibration absorber 74 is provided between the frame 12 and the guard main body 62 in the first embodiment.

The configuration of the frame 12 and the housing 30 can be freely changed. In a first example, the bolt attaching portion 14E is provided to the housing 30 instead of the frame 12. In a second example, a hook that is configured to connect the guard side hook 72E that is provided to the housing 30 in the same way as the frame side hook 14J, instead of the frame side hook 14J.

The bicycle guard 60 and the drive unit 20 of each of the embodiments can be applied to various bicycles, such as a city cycle, a mountain bike, and a road bike.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle guard comprising:
a guard main body having a first end portion and a second end portion, the first end portion and the second end portion being spaced apart from each other; and
a first attaching part provided on the first end portion and configured to be attached to a bracket that supports a housing configured to rotatably support a crankshaft to a bicycle frame, the first attaching part being configured to receive a fastener of a first connecting part that connects the bracket and the housing together.

2. The bicycle guard as recited in claim 1, wherein
the first attaching part is configured to be attached to and detached from the first connecting part in a state in which the housing and the bicycle frame are connected.

3. The bicycle guard as recited in claim 1, wherein
the first connecting part includes a first bolt, and
the first attaching part comprises a first hole configured to receive a first bolt as the fastener.

4. The bicycle guard as recited in claim 3, wherein
the first hole is internally threaded to mesh with an external thread of the first bolt, and
the first attaching part is configured to be disposed between a portion of the bracket and a portion of the housing.

5. The bicycle guard as recited in claim 1, wherein
the guard main body is configured to cover at least a portion of a lower portion of the housing in a state in which the first attaching part is attached to the first connecting part.

6. The bicycle guard as recited in claim 5, wherein
the guard main body is configured to entirely cover the lower portion of the housing in a state in which the first attaching part is attached to the first connecting part.

7. The bicycle guard as recited in claim 1, further comprising
a second attaching part configured to be attached to at least one of a second connecting part, which connects the housing and the bicycle frame in a position different from the first connecting part, the housing and the bicycle frame.

8. The bicycle guard as recited in claim 7, wherein
the second attaching part is configured to be attached to and detached from the at least one of the second connecting part, the housing and the bicycle frame in a state in which the housing and the bicycle frame are connected.

9. The bicycle guard as recited in claim 7, wherein
the second connecting part includes a second bolt, and
the second attaching part comprises a second hole that receives the second bolt.

10. The bicycle guard as recited in claim 7, wherein
the second attaching part comprises a third hole that receives a third bolt that is configured to be mounted to a bolt attaching part which is provided to the bicycle frame, and configured to be connected to the bicycle frame by the third bolt.

11. The bicycle guard as recited in claim 7, wherein
the first end portion and the second end portion of the guard main body are configured to cover at least a portion of a lower portion of the housing in a state in which the first attaching part is attached to the first connecting part,
the first attaching part is provided on one of the first and second end portions of the guard main body, and
the second attaching part is on the other of the first and second end portions of the guard main body.

12. The bicycle guard as recited in claim 7, further comprising
the first end portion and the second end portion of the guard main body are configured to cover at least a portion of a lower portion of the housing in a state in which the first attaching part is attached to the first connecting part,
the first attaching part is provided adjacent one of the first and second end portions of the guard main body, and
the second attaching part is provided adjacent the other of the first and second end portions of the guard main body.

13. The bicycle guard as recited in claim 7, further comprising
a vibration absorber provided to at least one of the first attaching part and the second attaching part.

14. The bicycle guard as recited in claim 1, wherein
the first connecting part is configured to connect a first frame side connecting part of the bicycle frame and a first housing side attaching part of the housing,
the first connecting part is configured to connect a second frame side connecting part of the bicycle frame and a second housing side attaching part of the housing,
the first and second frame side connecting parts are disposed at locations spaced apart in a direction parallel to a rotational axis of the crankshaft and the first and second housing side attaching parts are disposed at locations spaced apart in a direction parallel to the rotational axis of the crankshaft, and
the first attaching part is disposed between at least one of the frame side connecting parts and the housing side attaching parts.

15. A drive unit comprising:
the bicycle guard recited in claim 1, and the housing.

16. The drive unit as recited in claim 15, wherein
the first connecting part is configured to connect a first frame side connecting part of the bicycle frame and a first housing side attaching part of the bicycle frame,
the first connecting part is configured to connect a second frame side connecting part of the bicycle frame and the second housing side attaching part of the bicycle frame,
the first and second frame side connecting parts are disposed at locations spaced apart in a direction parallel to a rotational axis of the crankshaft and the first and second housing side attaching parts are disposed at locations spaced apart in a direction parallel to the longitudinal axis of the crankshaft, and
the first and second housing side attaching parts are configured to be disposed between the first and second frame side connecting parts.

17. The drive unit as recited in claim 16, wherein
the first attaching part is configured to be disposed between the first and second housing side attaching parts.

18. The drive unit as recited in claim 15, further comprising
a motor provided to the housing and configured to assist a manual drive force that is applied to the crankshaft.

19. The drive unit as recited in claim 15, further comprising
a transmission provided to the housing and configured to change a transmission ratio of a bicycle.

20. A bicycle guard comprising:
a first attaching part configured to be attached to a first connecting part that connects a housing configured to rotatably support a crankshaft to a bicycle frame; and
a second attaching part configured to be attached to at least one of the housing, the bicycle frame, and a second connecting part that connects the housing and the bicycle frame in a position different from the first connecting part, the second attaching part comprising a guard side hook which is configured to be connected to the bicycle frame.

21. A drive unit comprising:
a bicycle guard having a first attaching part configured to be attached to a first connecting part that connects a housing configured to rotatably support a crankshaft to a bicycle frame;
the first connecting part being configured to connect a first frame side connecting part of the bicycle frame and a first housing side attaching part of the bicycle frame,
the first connecting part being configured to connect a second frame side connecting part of the bicycle frame and the second housing side attaching part of the bicycle frame,
the first and second frame side connecting parts being disposed at locations spaced apart in a direction parallel to a rotational axis of the crankshaft and the first and second housing side attaching parts are disposed at locations spaced apart in a direction parallel to the rotational axis of the crankshaft, and each of the first and second housing side attaching parts comprising a fourth hole that extends in a direction parallel to the rotational axis of the crankshaft.

22. The drive unit as recited in claim 21, wherein a female thread is formed in the fourth hole.

\* \* \* \* \*